United States Patent [19]

Inoue et al.

[11] Patent Number: 5,058,382

[45] Date of Patent: * Oct. 22, 1991

[54] HYDROSTATICALLY OPERATED CONTINUOUSLY VARIABLE TRANSMISSION

[75] Inventors: Kazuo Inoue, Tokyo; Tsutomu Hayashi, Hohya, both of Japan

[73] Assignee: Honda Giken Kogyo Kabushiki Kaisha, Tokyo, Japan

[*] Notice: The portion of the term of this patent subsequent to Nov. 22, 2006 has been disclaimed.

[21] Appl. No.: 243,189

[22] Filed: Sep. 8, 1988

Related U.S. Application Data

[63] Continuation of Ser. No. 118,293, Nov. 6, 1987, abandoned.

[30] Foreign Application Priority Data

Nov. 11, 1986 [JP] Japan .................................. 61-264603

[51] Int. Cl.$^5$ ............................................. F16D 39/00
[52] U.S. Cl. .......................................... 60/488; 60/489
[58] Field of Search ................. 60/487, 488, 489, 325; 91/505, 506

[56] References Cited

U.S. PATENT DOCUMENTS

| | | | |
|---|---|---|---|
| 2,570,843 | 10/1951 | Orshansky, Jr. | 60/489 |
| 2,844,002 | 7/1958 | Pavesi . | |
| 3,161,023 | 12/1964 | Margolin et al. | 60/488 |
| 3,175,363 | 3/1965 | Molly | 60/488 X |
| 3,313,108 | 4/1967 | Allgaier et al. . | |
| 3,314,234 | 4/1967 | Orshansky, Jr. | 60/489 |
| 3,364,680 | 1/1968 | Osojnak | 60/489 |
| 4,735,050 | 4/1988 | Hayashi et al. . | |
| 4,741,251 | 5/1988 | Hayashi et al. . | |
| 4,745,748 | 5/1988 | Hayashi et al. . | |
| 4,748,898 | 6/1988 | Hayashi et al. . | |

FOREIGN PATENT DOCUMENTS

| | | |
|---|---|---|
| 0186500 | 2/1986 | European Pat. Off. . |
| 32-7159 | 9/1957 | Japan . |
| 61-153057 | 7/1986 | Japan . |
| 1222200 | 2/1971 | United Kingdom . |

Primary Examiner—Edward K. Look
Attorney, Agent, or Firm—Lyon & Lyon

[57] ABSTRACT

A hydrostatically operated continuously variable transmission for use with an engine includes a swash-plate-type axial-piston hydraulic pump and a swash-plate-type axial-piston hydraulic motor which are interconnected by a closed hydraulic circuit. The pump and motor cylinders of the pump and the motor are disposed coaxially with each other and integrally coupled to each other into a cylinder block. An input shaft connected to an engine is coupled centrally to the cylinder block, and a output tubular shaft connected to a load is relatively rotatably disposed on an outer periphery of the cylinder block. The pump swash plate of the pump is supported by a stationary machine frame. The motor swash plate of the motor is supported by the output tubular shaft.

3 Claims, 10 Drawing Sheets

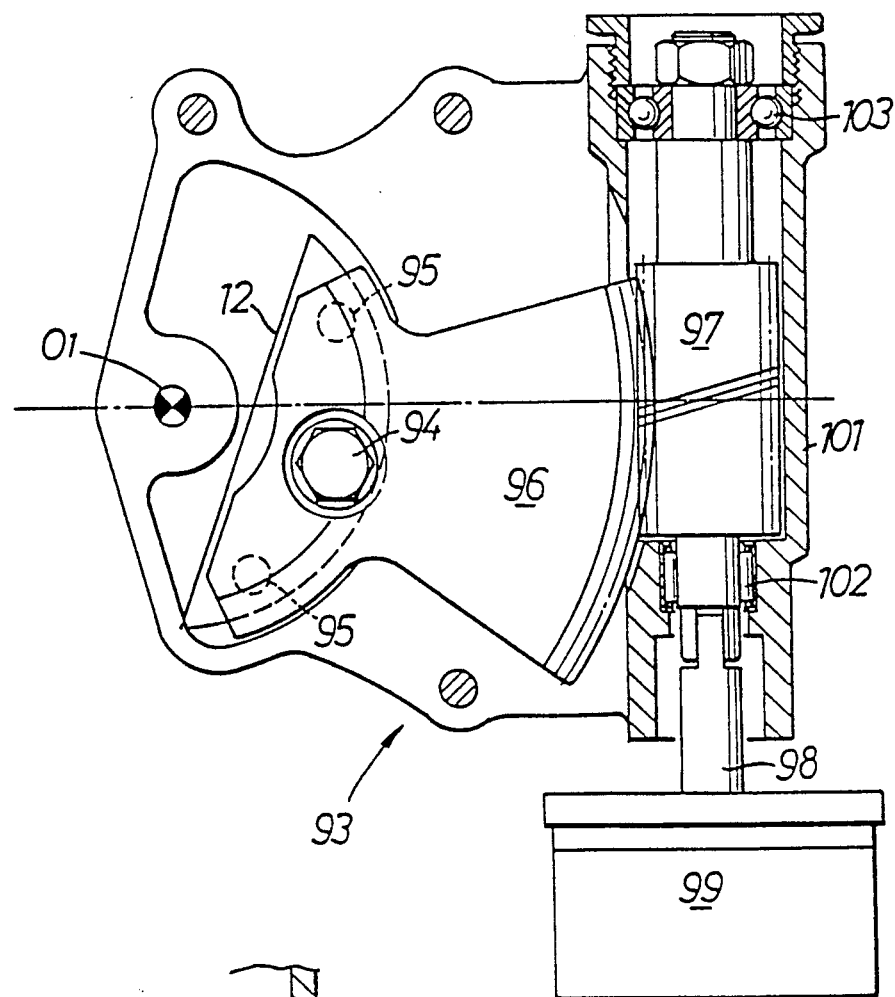
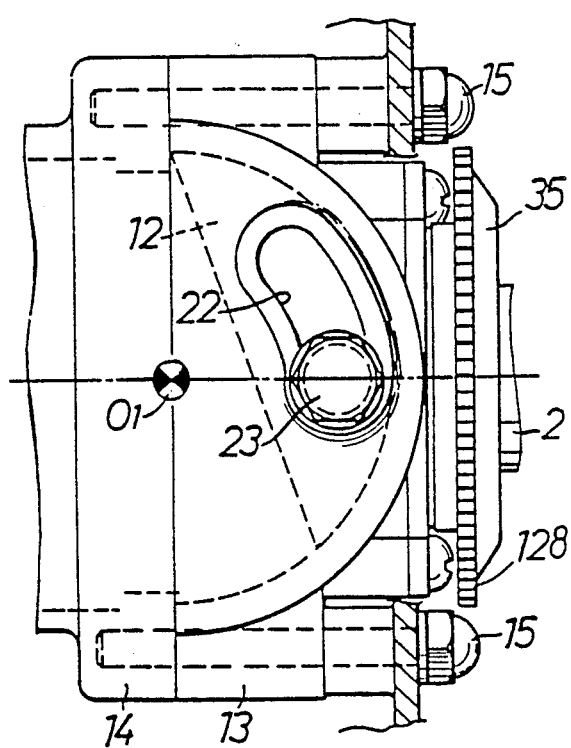

HYDROSTATICALLY OPERATED CONTINUOUSLY VARIABLE TRANSMISSION

This application is a continuation of application Ser. No. 118,293, filed Nov. 6, 1987, now abandoned.

BACKGROUND OF THE INVENTION

The present invention relates to a hydrostatically operated continuously variable transmission including a swash-plate-type axial-piston hydraulic pump and a swash-plate-type axial-piston hydraulic motor which are coupled in a closed hydraulic circuit, the hydraulic pump and motor having pump and motor cylinders, respectively, which are disposed coaxially with each other, the swash plate of at least one of the hydraulic pump and the hydraulic motor being tiltable.

Hydrostatically operated continuously variable transmissions are known in the art as disclosed in Japanese Patent Publication No. 32-7159, for example.

In the conventional hydrostatically operated continuously variable transmission, a pump cylinder and a motor cylinder are relatively rotatably disposed in confronting relationship with a hydraulic pressure distributor interposed therebetween, and input and output shafts are coupled respectively to the pump and motor cylinders at their centers. Therefore, the axial length, particularly, of the transmission is quite large. The transmission may not be employed in some applications dependent on the layout of the power unit with which the transmission is to be combined. For instance, a transmission for use in an automotive power unit generally has an input shaft to be coupled coaxially with the crankshaft of the engine of the power unit. If such a transmission comprises a conventional hydrostatically operated continuously variable transmission, then the overall length of the power unit is increased to the extent that the power unit may not be installed in the limited space of an engine compartment.

SUMMARY OF THE INVENTION

In view of the aforesaid difficulty of the conventional hydrostatically operated continuously variable transmission, it is an object of the present invention to provide a hydrostatically operated continuously variable transmission of a compact construction which includes an input member disposed in a central area and an output member disposed on an outer peripheral area.

According to the present invention, there is provided a hydrostatically operated continuously variable transmission for use with an engine, comprising a swash-plate-type axial-piston hydraulic pump having a pump cylinder and a pump swash plate, a swash-plate-type axial-piston hydraulic motor having a motor cylinder and a motor swash plate, at least one of the pump and motor swash plates being tiltable, a closed hydraulic circuit interconnecting the hydraulic pump and the hydraulic motor, the pump cylinder and the motor cylinder being disposed coaxially with each other and integrally coupled to each other into a cylinder block, an input shaft adapted to be connected to the engine and coupled centrally to the cylinder block, and an output tubular shaft adapted to be connected to a load and relatively rotatably disposed on an outer periphery of the cylinder block, the pump swash plate being supported by a stationary machine frame, the motor swash plate being supported by the output tubular shaft.

Since the input shaft is disposed centrally in the cylinder block and the output tubular shaft is disposed on the outer periphery of the cylinder block, the axial length of the overall transmission is relatively small. Therefore, even where the input shaft is connected coaxially to the engine, the length of a power unit comprising the engine and the transmission is not increased.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 18 is a cross-sectional view taken along line XVIII—XVIII of FIG. 3;

FIG. 19 is a fragmentary view in the direction of arrow XIX of FIG. 3; and

DESCRIPTION OF THE PREFERRED EMBODIMENT

Figure 1:
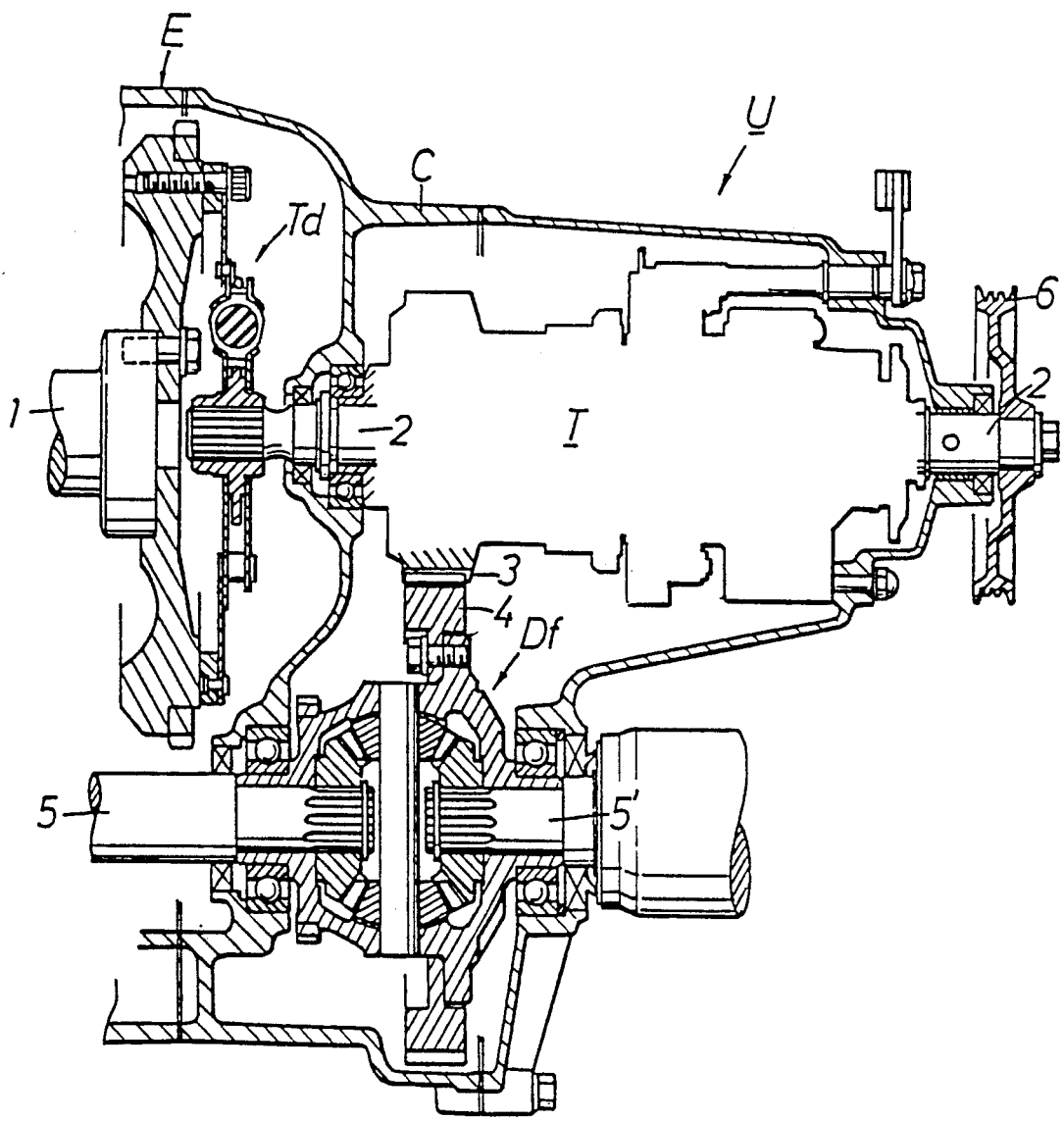
FIG. 1 is a cross-sectional view of an automotive power unit, as viewed from behind, incorporating a hydrostatically operated continuously variable transmission according to the present invention.

As shown in FIG. 1, an automotive power unit U generally comprising an engine E, a hydrostatically operated continuously variable transmission T, and a differential Df which are all housed and supported in a casing C serving as a stationary machine frame.

The engine E has a crankshaft 1, and the continuously variable transmission T positioned at the righthand (FIG. 1) end of the engine E has an input shaft 2 disposed coaxially with the crankshaft 1 and coupled thereto through a torque damper Td. The continuously variable transmission T has an output gear 3 located closely to the engine E and meshing with a ring gear 4 of the differential Df. The differential Df has axially opposite output shafts 5, 5' parallel to the crankshaft 1 and the input shaft 2 for driving respective wheel axles.

The input shaft 2 has a righthand end projecting out of the casing C and supporting a pulley 6 thereon for driving various accessories such as a power steering hydraulic pump, an air conditioning compressor, and the like.

Figure 2:
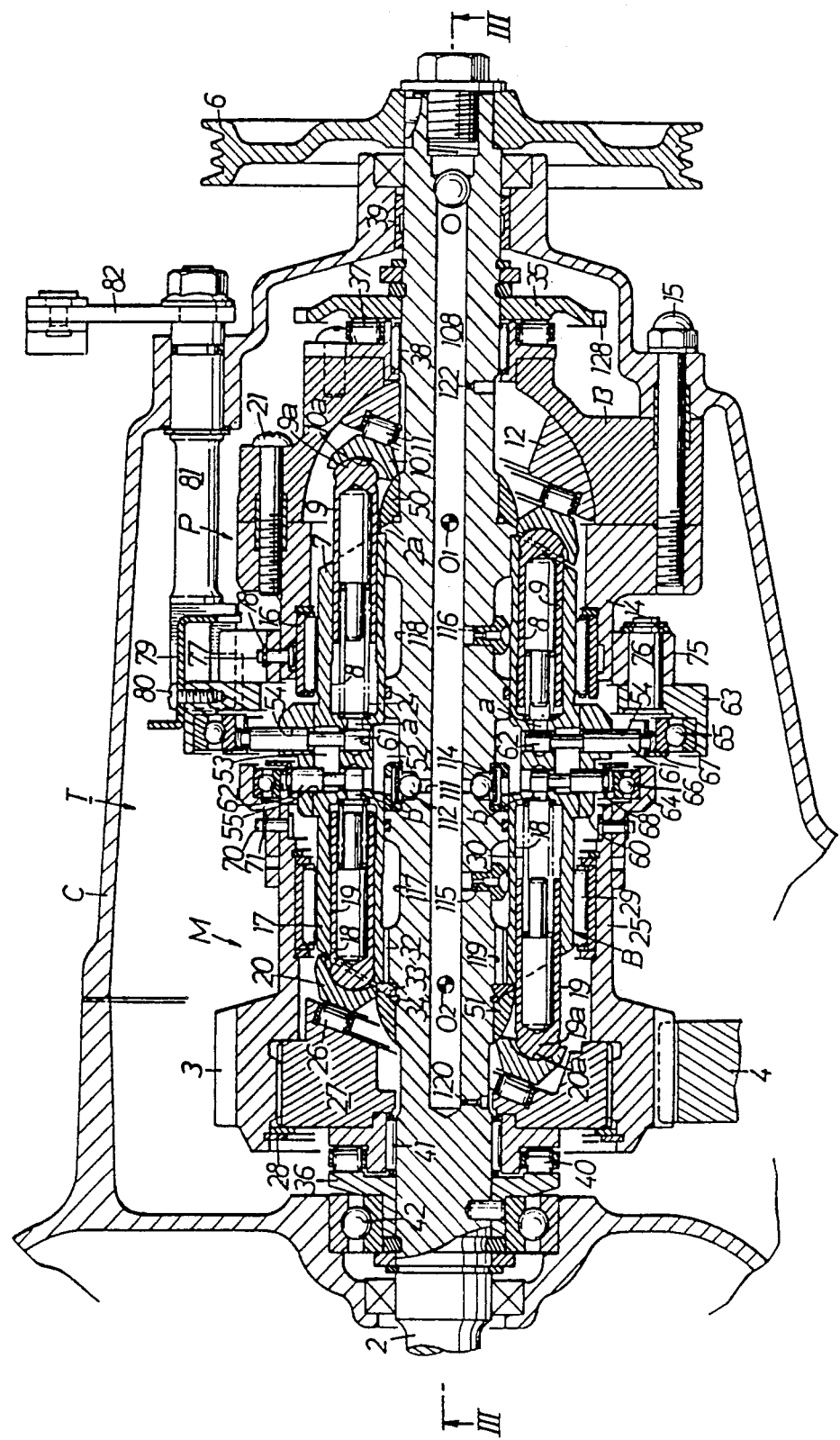
FIG. 2 is a longitudinal cross-sectional view of the hydrostatically operated continuously variable transmission, as viewed from above, shown in FIG. 1.
Figure 3:
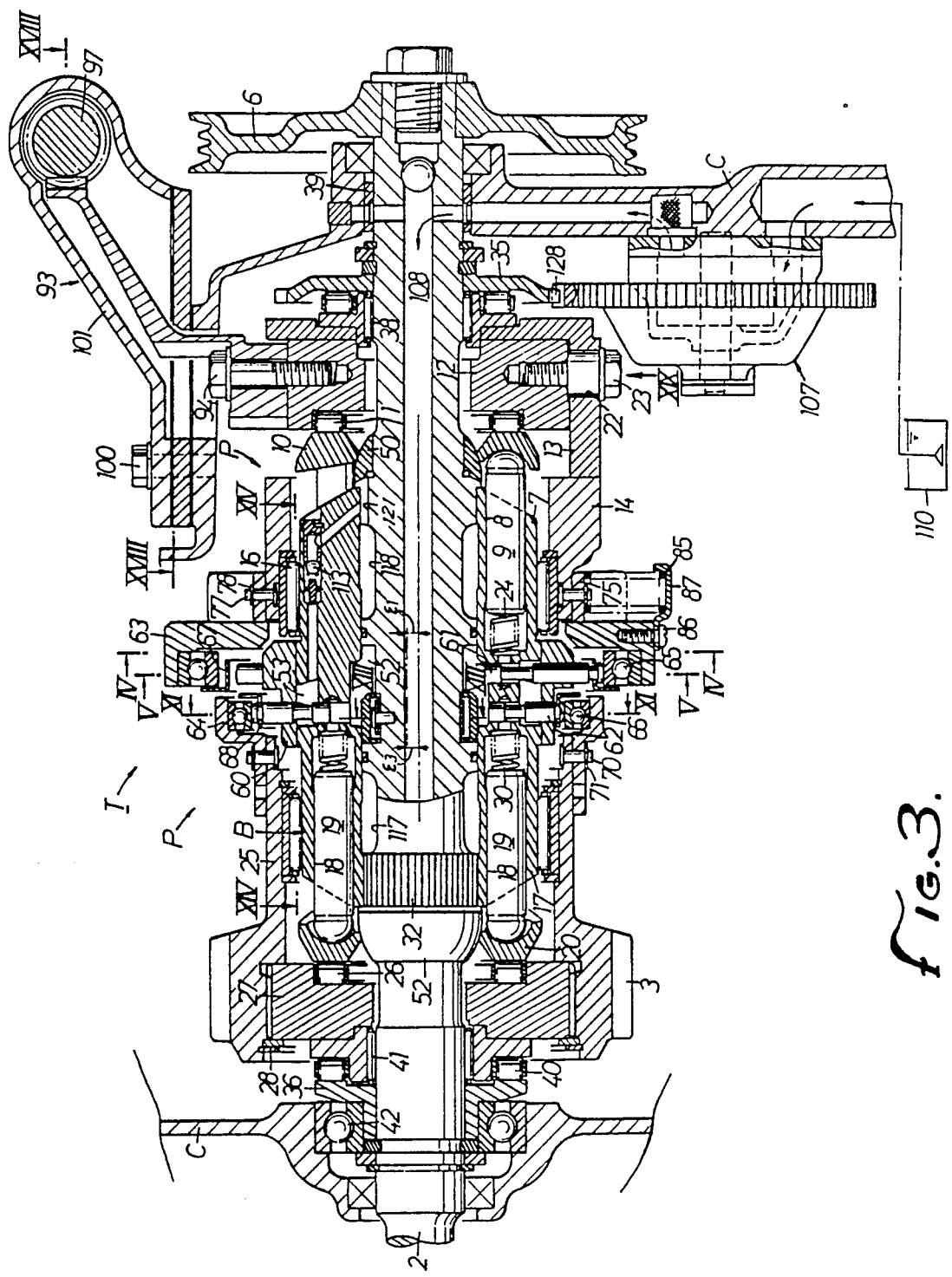
FIG. 3 is a cross-sectional view taken along line III—III of FIG. 2.

As shown in FIGS. 2 and 3, the continuously variable transmission T generally comprises a swash-plate-type axial-piston hydraulic pump P of the variable displacement type and a swash-plate-type axial-piston hydraulic motor M of the fixed displacement type.

The hydraulic pump P has a pump cylinder 7 having a plurality of cylinder bores or holes 8 defined therein in an annular pattern around the center of rotation of the pump cylinder 7, a plurality of pump plungers 9 slidably disposed in the cylinder holes 8, respectively, a pump swash plate 10 held against the outer ends of the pump plungers 9, a trunnion shaft 12 of a segmental cross section having a flat surface supporting the back of the pump swash plate 10 through a thrust roller bearing 11, and a swash plate anchor 13 in which the partly cylindrical surface of the trunnion shaft 12 is rotatably supported.

The swash plate anchor 13 and a cylindrical cylinder holder 14 held against the lefthand surface thereof are fastened to the casing C by means of a bolt 15. The pump cylinder 7 is rotatably supported at its outer periphery in the cylinder holder 14 through a needle bearing 16. The swash plate anchor 13 and the cylinder holder 14 are coupled to each other in advance by means of a bolt 21.

In order to allow the trunnion shaft 12 to rotate through a prescribed angle and also to prevent axial movement of the trunnion shaft 12, a bolt 23 (FIGS. 3 and 19) is fixed to one end surface of the trunnion shaft 12 through an arcuate slot 22 defined in the swash plate anchor 13 about the axis 01 of the trunnion shaft 12.

The pump swash plate 10 is tiltable between an upright position in which it is normal to the axis of the pump cylinder 7 and two maximum tilted positions on both sides of the upright position, in which it is inclined at a certain angle, in response to rotation of the trunnion shaft 12. When the pump swash plate 10 is tilted, the pump plungers 9 can be reciprocally moved in repeated suction and discharge strokes in response to rotation of the pump cylinder 7.

Coil springs 24 are disposed under compression in the respective cylinder holes 8 for normally urging the pump plungers 9 in an extending direction for thereby enabling the pump plungers 9 to well follow the motion of the pump swash plate 10.

The hydraulic motor M has a motor cylinder 17 disposed coaxially with and positioned leftwardly of the pump cylinder 7, the motor cylinder 17 having a plurality of cylinder bores or holes 18 defined therein in an annular pattern around the center of rotation of the motor cylinder 17, a plurality of motor plungers 19 slidably disposed in the cylinder holes 18, respectively, a motor swash plate 20 held against the outer ends of the motor plungers 19, a motor swash plate holder 27 supporting the back of the motor swash plate 20 through a thrust roller bearing 26 for keeping the motor swash plate 20 tilted at an angle with respect to the axis of the motor cylinder 17 about an imaginary trunnion axis 02 normal to the axis of the motor cylinder 17, and an output tubular shaft 25 rotatably supported around the motor cylinder 17 through a needle bearing 29. The output gear 3 is formed on the outer periphery of the lefthand end of the output tubular shaft 25.

The motor swash plate holder 27 is removably splined to the inner peripheral surface of the lefthand end of the output tubular shaft 25 and retained therein by a circlip or retaining ring 28. When the motor cylinder 17 is rotated about its own axis, the motor swash plate 27 enables the motor plungers 19 to move reciprocally in repeated expansion and contraction strokes.

In order to permit the motor plungers 19 to well follow the motion of the motor swash plate 20, coil springs 30 are disposed under compression in the respective cylinder holes 18 for normally urging the motor plungers 29 in an extending direction.

The pump cylinder 7 and the motor cylinder 17 jointly constitute an integral cylinder block B through which the input shaft 2 centrally extends. The cylinder block B may be of a unitary structure including the pump cylinder 7 and the motor cylinder 17 as one piece, or the pump cylinder 7 and the motor cylinder 17 may be separate members and fastened to each other by bolts or other fastening members. The input shaft 2 has an integral flange 2a on its outer peripheral surface, and the pump cylinder 7 has an outer end held against the flange 2a. The motor cylinder 17 is splined to the input shaft 2 at 32. The outer end of the motor cylinder 17 is held against a seat member 33 which is retained in place by a circlip or retaining ring 34 lockingly disposed around the input shaft 2. The cylinder block B is therefore fixedly mounted on the input shaft 2.

The righthand end portion of the input shaft 2 extends through the pump swash plate 10, the trunnion shaft 12, and the swash plate anchor 13. A thrust roller bearing 37 is interposed between a first thrust support plate 35 mounted on the righthand end portion of the input shaft 2 and the swash plate anchor 13. The righthand end portion of the input shaft 2 is rotatably supported in the swash plate anchor 13 by a needle bearing 38 and in the casing C by a bushing 39.

The first thrust support plate 35 is splined to the input shaft 2.

The input shaft 2 has a lefthand end portion extending through the motor swash plate 20 and the motor swash plate holder 27. A thrust roller bearing 40 is interposed between a second thrust support plate 36 mounted on the lefthand end portion of the input shaft 2 and the motor swash plate holder 27, with a needle bearing 41 disposed between the moror swash plate holder 27 and the input shaft 2. The lefthand end portion of the input shaft 2 is rotatably supported in the casing C by a roller bearing 42.

Over the input shaft 2, there are fitted a hemispherical aligning member 50 tiltable omnidirectionally with respect to the inner peripheral surface of the pump swash plate 10, and another hemispherical aligning member 51 tiltable omnidirectionally with respect to the inner peripheral surface of the motor swash plate 20, for aligning the pump swash plate 10 and the motor swash plate 20.

The swash plates 10, 20 have respective partly spherical recesses 10a, 20a in which partly spherical ends 9a, 19a of the plungers 9, 19 engage, respectively, so as to keep the swash plates 10, 20 well aligned and also to prevent the pump swash plate 10 and the pump plungers 9 and also the motor swash plate 20 and the motor plungers 19 from slipping relatively to each other in the direction in which they rotate.

The hydraulic pump P and the hydraulic motor M are interconnected by a closed hydraulic circuit as follows:

The cylinder block B has, between the cylinder holes 8 of the pump cylinder 7 and the cylinder holes 18 of the motor cylinder 17, annular inner and outer oil passages 52, 53 defined concentrically around the input shaft 2, as many first valve holes 54 as the number of the cylinder holes 8 and as many second valve holes 55 as the number of the cylinder holes 18, the first and second valve holes 54, 55 being defined radially through an annular partition between the oil passages 52, 53 and an outer peripheral wall of the outer oil passage 53, a plurality of pump ports a through which the cylinder holes 8 and the respective first valve holes 54 communicate with each other, and a plurality of motor ports b through which the cylinder holes 18 and the respective second valve holes 55 communicate with each other. The inner and outer oil passages 52, 53 correspond to lower- and higher-pressure oil passages, respectively.

The inner oil passage 52 is defined as annular grooves in confronting peripheral surfaces of the cylinder block B and the input shaft 2.

Figure 14:
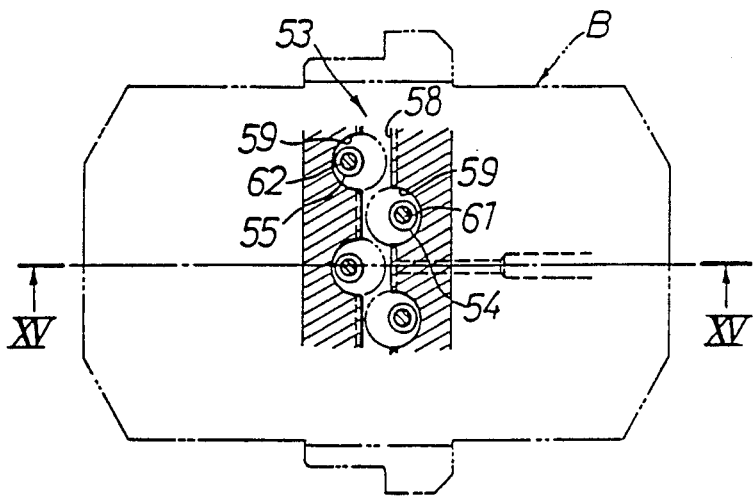
Figure 15:
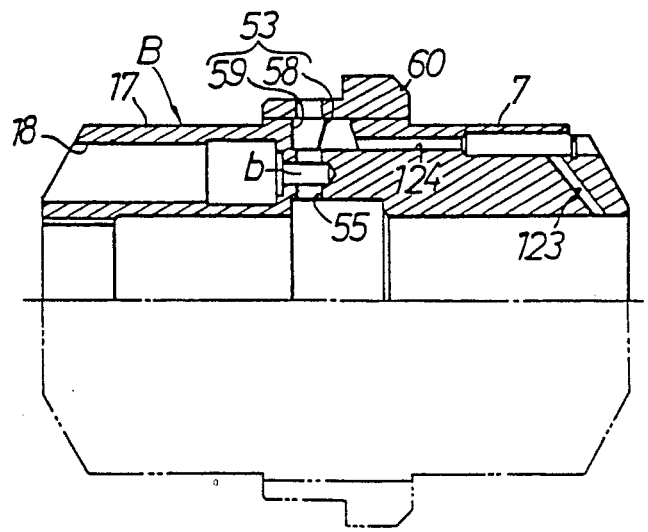
FIG. 15 is a cross-sectional view taken along line XV—XV of FIG. 14.

As illustrated in FIGS. 14 and 15, the outer oil passage 55 includes an annular dovetail groove 58 defined in the outer periphery of the cylinder block B and a plurality of semicircular recesses 59 defined in a staggered or zigzag pattern in the opposite side walls of the dovetail groove 58. Radially outer open ends of the dovetail groove 58 and the recesses 59 are closed by a sleeve 60 welded to the outer peripheral surface of the cylinder block B. The outer oil passage 52 of this construction is effective in minimizing a high-pressure capacity.

The first and second valve holes 54, 55 are arranged to extend through the bottoms of the staggered recesses 59. The cylinder holes 8 of the hydraulic pump P and the cylinder holes 18 of the hydraulic motor M are correspondingly angularly displaced in position with respect to each other in the circumferential direction.

With this arrangement, the distance between the first and second valve holes 54, 55 in the axial direction of the cylinder block B can be reduced while increasing a wall thickness of the cylinder block B between the first and second valve holes 54, 55. Therefore, the cylinder block B can be of a compact structure.

Moreover, when the opposite side walls of the dovetail groove 58 are spread away from each other under a high oil pressure introduced into the outer oil passage 52, the pressure on the fitting surfaces of the cylinder block B and the sleeve 60 is increased by the deformation of the dovetail groove 58, thus preventing oil from leaking along the fitting surfaces.

First spool-shaped distribution valves 61 are slidably disposed respectively in the first valve holes 54, and second spool-shaped distribution valves 62 are slidably disposed respectively in the second valve holes 55. The radially outer ends of the first distribution valves 61 are engaged by a first surrounding eccentric ring 63 through a ball bearing 65, and the radially outer ends of the second distribution valves 62 are engaged by a second surrounding eccentric ring 64 through a ball bearing 66. To keep the outer ends of the first and second distribution valves 61, 62 in forced engagement with the first and second eccentric rings 63, 64, the outer ends of the first distribution valves 61 are interconnected by a first forcing ring 67 concentric with the first eccentric ring 63, and the outer ends of the second distribution valves 62 are interconnected by a second forcing ring 68 concentric with the second eccentric ring 64, as will be described later on.

Figure 4:
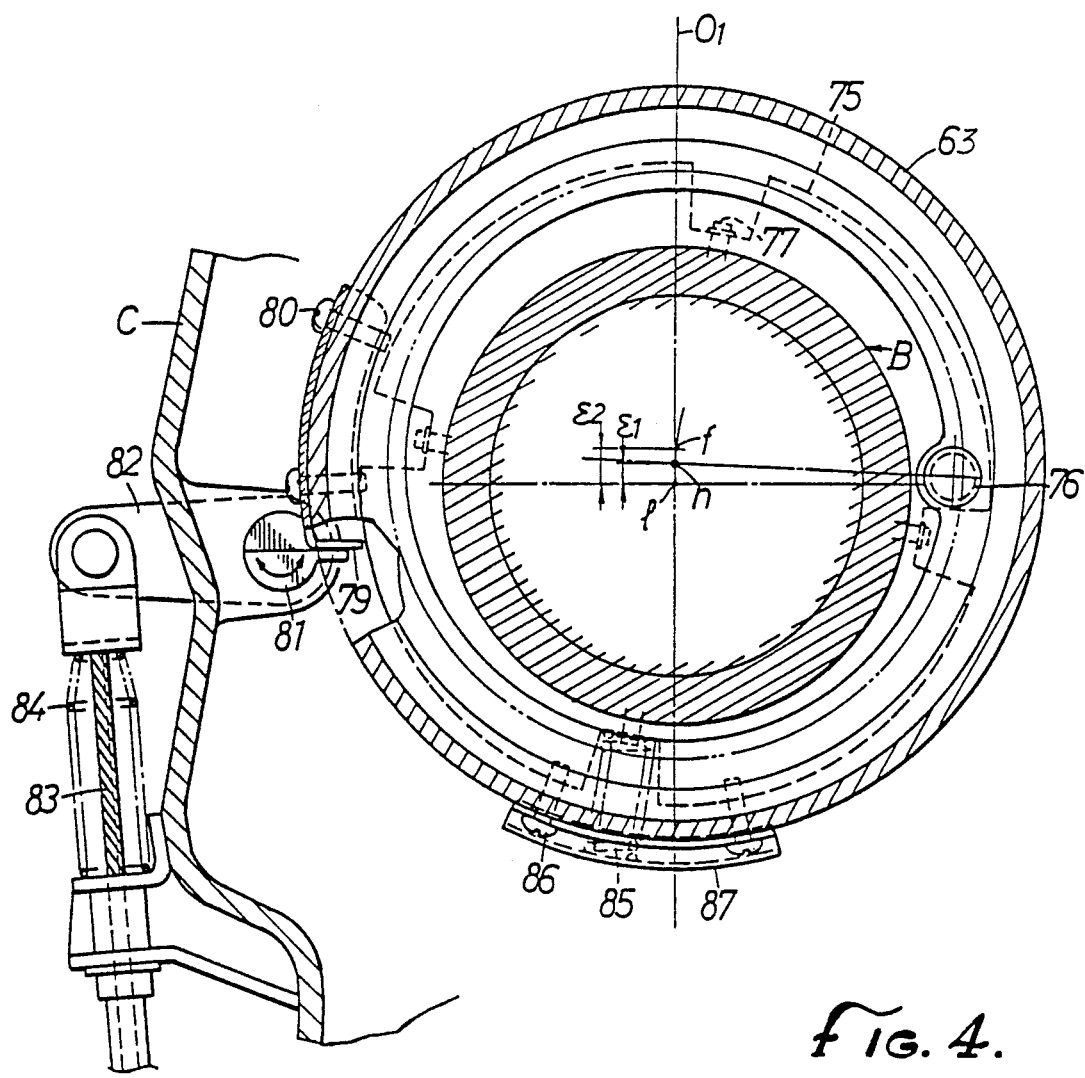
FIG. 4 is a cross-sectional view taken along line IV—IV of FIG. 3.
Figure 7:
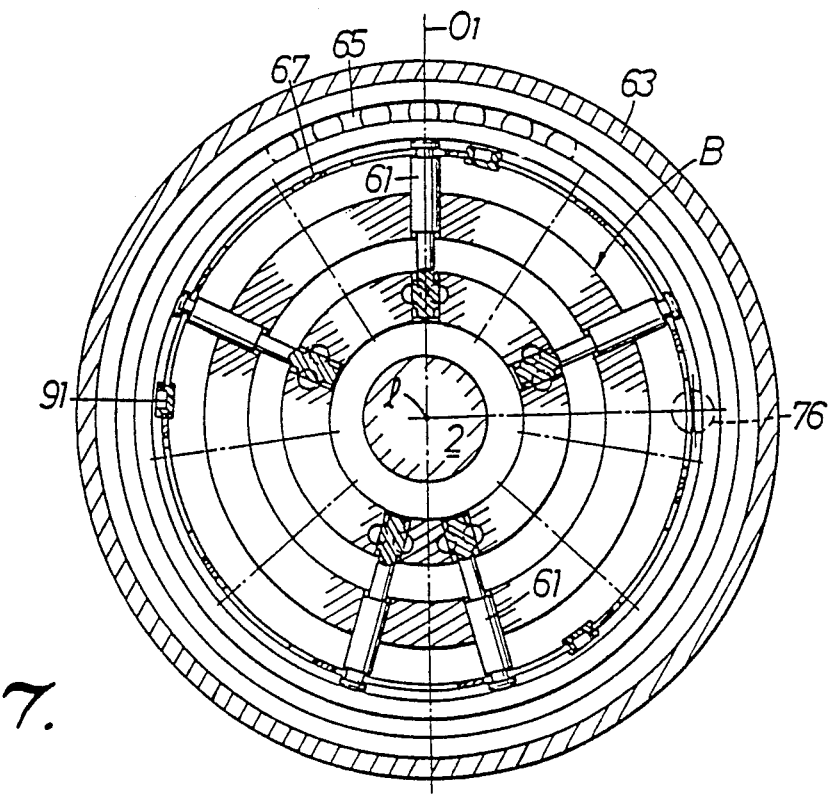
FIG. 7 is a view similar to FIG. 5, showing the first eccentric ring in a lock-up position.

As shown in FIGS. 2, 4, and 7, the first eccentric ring 63 is coupled to a support ring 75 by a pivot shaft 76 parallel to the input shaft 2 so as to be swingable between a lock-up position 1, a clutch-on position n, and a clutch-off position f. The support ring 75 is fixed to the outer periphery of the cylinder holder 14 by means of a plurality of headed pins 77 and clips 78.

The first eccentric ring 63 is controlled in its eccentricity substantially along the trunnion axis 01 with the center of the input shaft 2 being used as a reference. The amount of eccentricity of the first eccentric ring 63 is zero (i.e., it is concentric with the input shaft 2) when it is in the lock-up position 1, is $\epsilon 1$ when it is in the clutch-on position n, and is $\epsilon 2$ (larger than $\epsilon 1$) when it is in the clutch-off position f.

Figure 5:
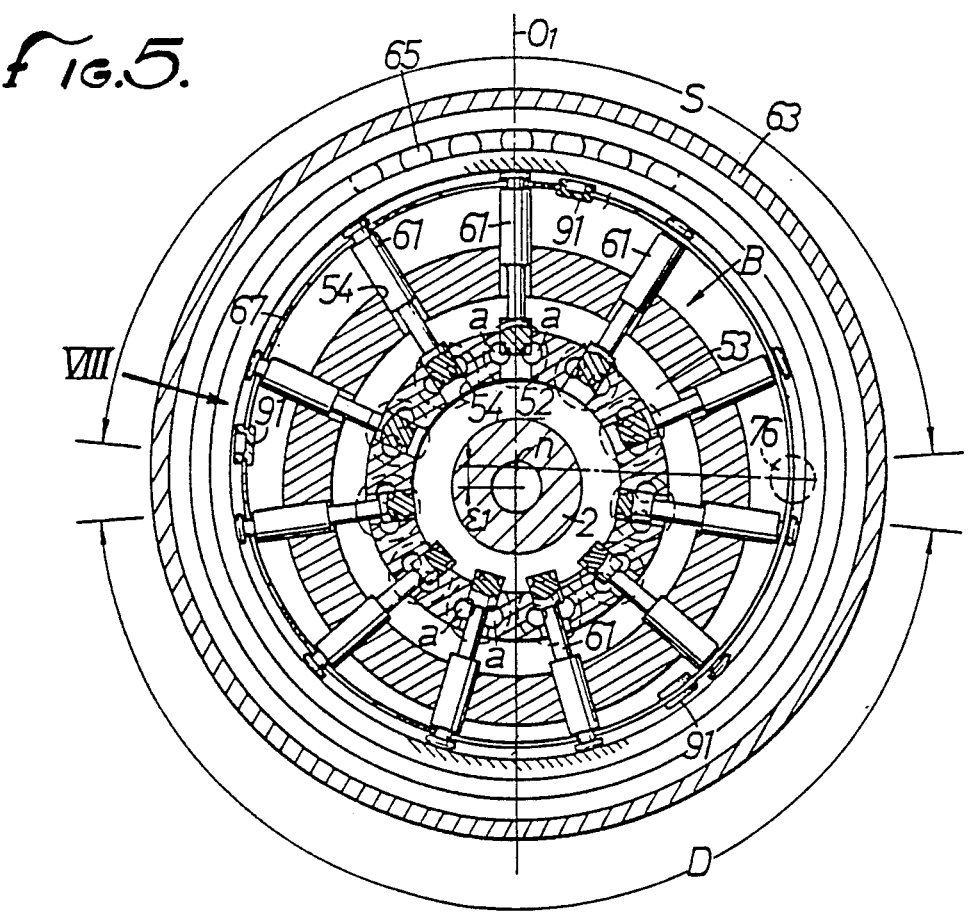
FIG. 5 is a cross-sectional view taken along line V—V of FIG. 3, with a first eccentric ring in a clutch-on position.

When the first eccentric ring 63 takes the clutch-on position n (see FIG. 5), and when the cylinder block B is rotated, the first distribution valves 61 are caused by the first eccentric ring 63 to reciprocally move in the respective first valve holes 54 between radially inner and outer positions in the cylinder block B over a stroke which is twice the amount of eccentricity $\epsilon 1$. The hydraulic pump P is now given a discharge region D and a suction region S.

In the discharge region D, as the cylinder block B rotates, the first distribution valves 61 move near the radially inner position to provide communication between the corresopnding pump ports a and the outer oil passage 53 and to keep those pump ports a out of communication with the inner oil passage 52, so that the pump plungers 9 in the discharge stroke discharge working oil from the cylinder holes 8 into the outer oil passage 53. In the suction region S, the first distribution valves 61 move near the radially outer position to provide communication between the corresponding pump ports a and the inner oil passage 52 and to keep those pump ports a out of communication with the outer oil passage 53, so that the pump plungers 9 in the suction stroke draw working oil from the inner oil passage 52 into the cylinder holes 8.

Between the discharge and suction regions D, S, there are provided switching neutral regions in which the pump ports a are held out of communication with the inner and outer oil passages 52, 53 by the first distribution valves 61.

Figure 6:
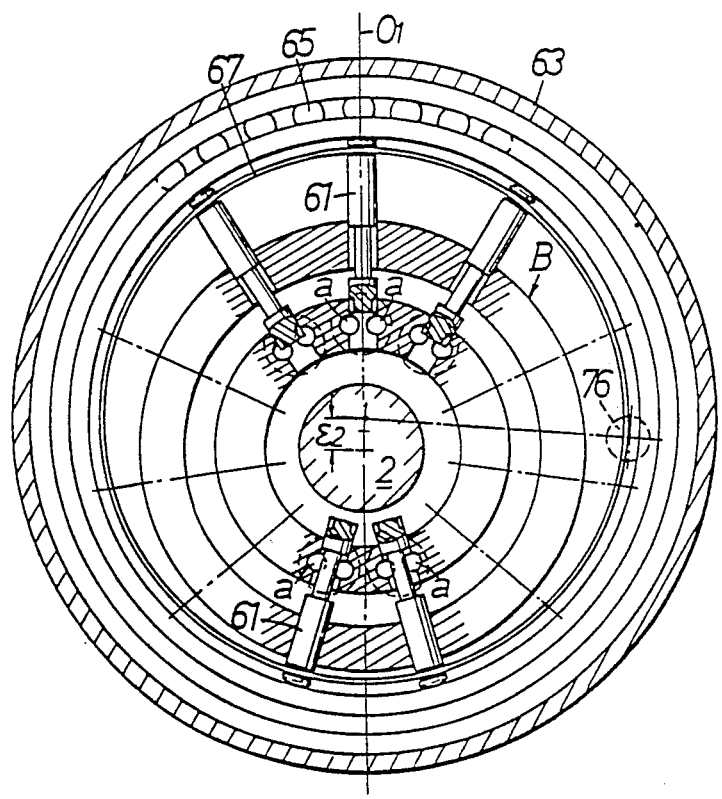
FIG. 6 is a view similar to FIG. 5, showing the first eccentric ring in a clutch-off position.

When the first eccentric ring 63 takes the clutch-off position f (see FIG. 6), and when the cylinder block B is rotated, the first distribution valves 61 are caused by the first eccentric ring 63 to reciprocally move in the respective first valve holes 54 between radially inner and outer positions in the pump cylinder 7 over a stroke which is twice the amount of eccentricity $\epsilon 2$. In the radially inner and outer positions, the first distribution valves 61 provide communication between the inner and outer oil passages 52, 53.

When the first eccentric rings 63 assumes the lock-up position 1 (see FIG. 7), all of the first distribution valves 61 are kept in the switching neutral position by the first eccentric ring 63 irrespective of rotation of the cylinder block B, thus closing all of the pump ports a.

Figure 11:
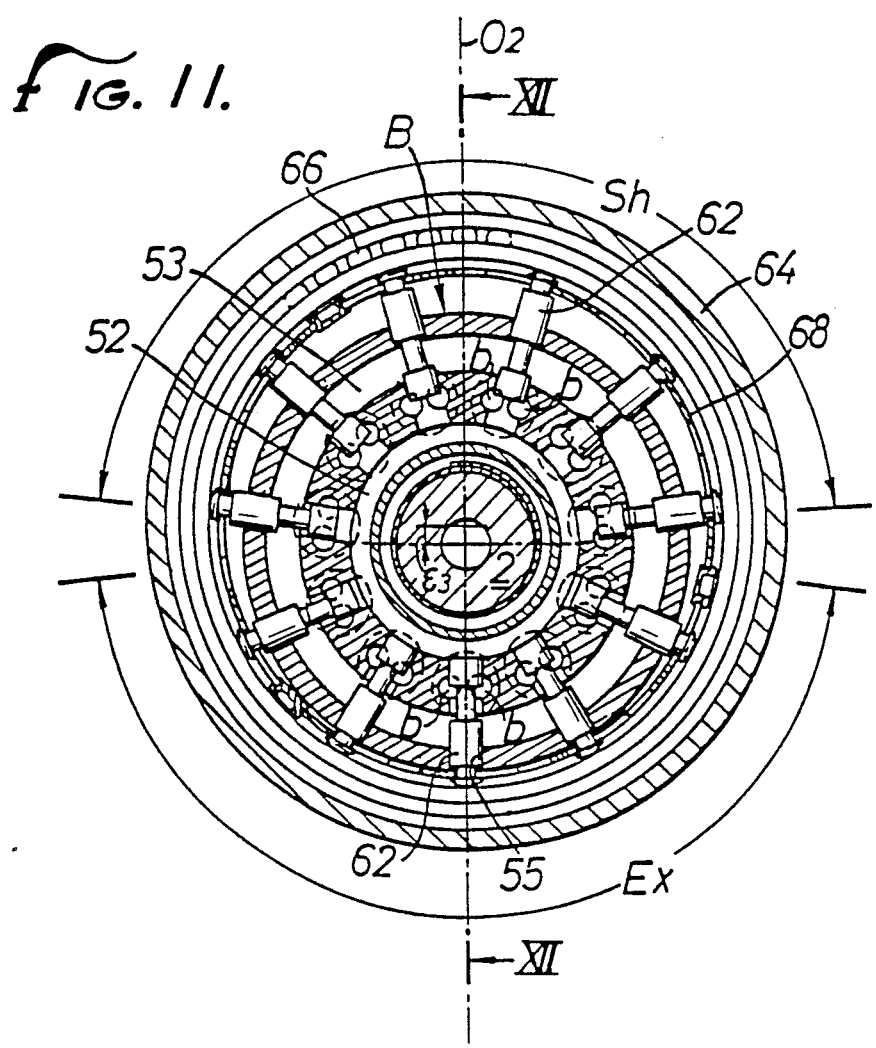
FIG. 11 is a cross-sectional view taken along line XI—XI of FIG. 3.

The second eccentric ring 64 is secured to the outer periphery of the output tubular shaft 25 by means of headed pins 70 and clips 71. As shown in FIG. 11, the second eccentric ring 64 is held in a position which is eccentrically displaced ∈3 from the center of the input shaft 2 along the imaginary trunnion axis 02 for the motor swash plate 20.

Upon relative rotation between the cylinder block B and the output tubular shaft 25, the second distribution valves 62 are caused by the second eccentric ring 64 to reciprocally move in the respective second valve holes 55 between radially inner and outer positions in the cylinder block B over a stroke which is twice the amount of eccentricity ∈3. The hydraulic motor M is now given an expansion region Ex and a contraction region Sh.

In the expansion region Ex, the second distribution valves 62 move near the radially inner position to provide communication between the corresponding motor ports b and the outer oil passage 53 and to keep those motor ports b out of communication with the inner oil passage 52, so that high-pressure working oil is supplied from the outer oil passage 53 into the cylinder holes 18 housing the motor plungers 19 in the expansion stroke. In the contraction region Sh, the second distribution valves 62 move near the radially outer position to provide communication between the corresponding motor ports b and the inner oil passage 52 and to keep those motor ports b out of communication with the outer oil passage 53, so that the motor plungers 19 in the contraction stroke discharge working oil from the cylinder holes 8 into the lower-pressure inner oil passage 52.

Each of the cylinder holes 8 is associated with a pair of pump ports a arranged side by side in a direction normal to the direction in which the corresponding first distribution valve 61 is slidable. Likewise, each of the cylinder holes 18 is associated with a pair of motor ports b arranged side by side in a direction normal to the direction in which the corresponding second distribution valve 62 is slidable. With this paired port arrangement, the cross-sectional area of the combined passages of the pump and motor ports a, b is large, and the pump and motor ports a, b can be opened and closed by the distribution valves 61, 62 which move in a relatively short stroke.

As shown in FIG. 4, an abutment plate 79 is fastened to the peripheral wall of the first eccentric ring 63 remote from the pivot shaft 76 by means of a screw 80. A camshaft 81 rotatably supported on the casing C engages the abutment plate 79 so that the camshaft 81 can push the abutment plate 79 in a manner to shift the first eccentric ring 63 toward the clutch-off position f. The camshaft 81 has an outer end to which there is fixed an operating lever 82 coupled to a control wire 83. A return spring 84 is disposed under compression between the operating lever 82 and the casing C for returning the operating lever 82. The first eccentric ring 63 is normally urged toward the lock-up position 1 by a spring 85 disposed under compression between the support ring 75 and a retainer 87 secured to the outer periphery of the first eccentric ring 63 by a screw 86. Therefore, the first eccentric ring 63 can be moved from the lock-up position 1 to the clutch-off position f by pulling the control wire 83.

Operation of the hydrostatic continuously variable transmission T thus constructed is as follows: While the pump swash plate 10 is inclined at an angle and the first eccentric ring 63 is kept in the clutch-on position n, the input shaft 2 is rotated about its own axis by the power of the engine E. In the hydraulic pump P, while the pump plungers 9 in the discharge stroke are passing through the discharge region D, they discharge working oil under pressure from their cylinder holes 8 into the outer oil passage 53, whereas the pump plungers 9 in the suction stroke draw working oil from the inner oil passage 52 into the cylinder holes 8 while those pump plungers 9 are passing through the suction region S.

The high-pressure working oil discharged into the outer oil passage 53 is supplied into the cylinder holes 18 housing the motor plungers 19 in the expansion region Ex, while at the same time working oil is discharged into the inner oil passage 52 from the cylinder holes 18 housing the motor plungers 19 in the contraction region Sh.

During this time, the cylinder block B is rotated about its own axis under the sum of a reactive torque which the pump cylinder 7 receives from the pump swash plate 10 through the pump plungers 9 in the discharge stroke and a reactive torque which the motor cylinder 17 receives from the motor swash plate 20 through the motor plungers 19 in the expansion stroke. The torque of the cylinder block B is then transmitted from the output tubular shaft 25 to the differential Df.

It is now assumed that $n_P$...the number of the pump plungers 9,
$n_M$...the number of the motor plungers 19,
$d_P$...the diameter of the pump plungers 9,
$d_M$...the diameter of the motor plungers 19,
$D_P$...the diameter of the pitch circle of the circular array of the pump plungers 9,
$D_M$...the diameter of the pitch circle of the circular array of the motor plungers 19,
$O_P$...the angle of inclination of the pump swash plate 10 to a vertical plane,
$O_M$...the angle of inclination of the motor swash plate 20 to a vertical plane,
$S_P$...the stroke of the pump plungers 9,
$S_M$...the stroke of the motor plungers 19,
Ni...the speed of rotation of the input shaft 2, and
No...the speed of rotation of the output tubular shaft 25.

The transmission ratio $\pi$ can now be calculated by the following equation:

$$\pi = \frac{Ni}{No} = \frac{1}{1 - \frac{n_P \cdot d_P^2 \cdot S_P}{n_M \cdot d_M^2 \cdot S_M}} = \frac{1}{1 - \frac{n_P \cdot d_P^2 \cdot D_P \cdot \tan \theta_P}{n_M \cdot d_M^2 \cdot D_M \cdot \tan \theta_M}}$$

Since $n_P = n_M$, $d_P = d_M$, and $D_P = D_M$ in the illustrated embodiment, the transmission ratio $\pi$ is given as follows:

$$\pi = \frac{1}{1 - \frac{\tan \theta_P}{\tan \theta_M}}$$

The manner in which the transmission ratio $\pi$ is varied will be described below. Where the motor swash plate 20 is tilted at the fixed angle $\theta_M$ as shown, assuming that the angle $\theta_P$ of inclination of the pump swash plate 10 is $\theta_P = 0°$, then $$\pi = \frac{1}{1-0} = 1$$

If $\theta_P$ = a negative angle, then $$\pi = \frac{1}{1 - \text{negative angle}} < 1$$

If $\theta_P = \theta_M$, then $$\pi = \frac{1}{1-1} = \infty$$

If $\theta_P > \theta_M$, then $$\pi = \frac{1}{1 - (1+a)} = \text{a negative number}$$

($a$ is a positive number).

Figure 20:
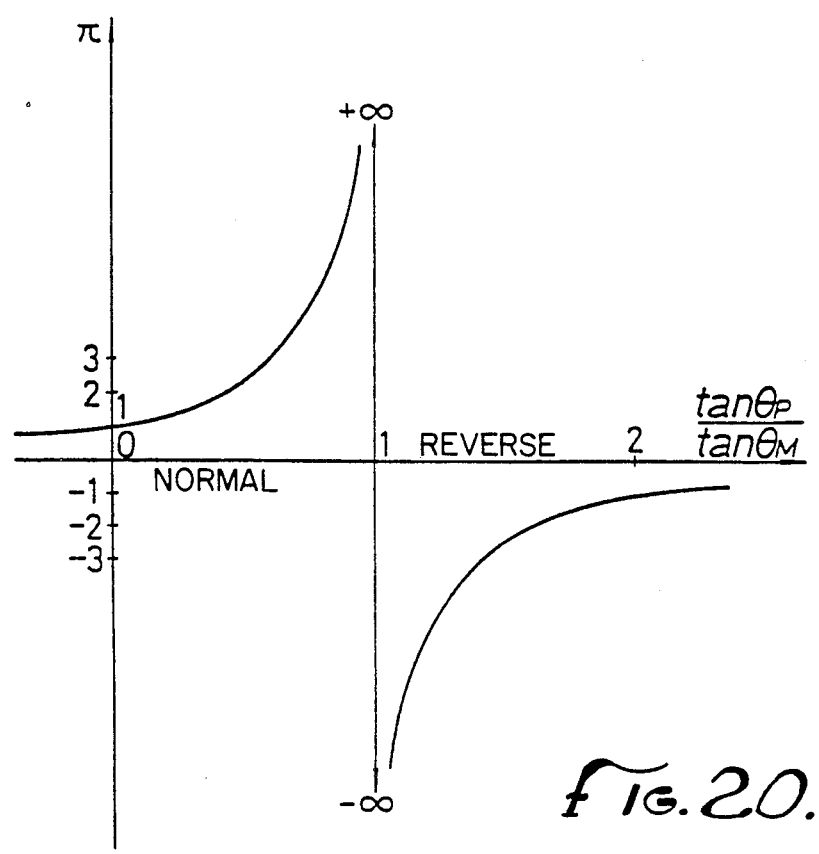
FIG. 20 is a graph showing the relationship between the angles of inclination of pump and motor swash plates and the transmission ratio.

The above conditions are illustrated in FIG. 20. As is apparent from FIG. 20, when $\theta_P$=negative, the speed is increased; when $\theta_P$=0, No=Ni, i.e., the input shaft 2 and the output tubular shaft 25 rotates at the same speed; when $\theta_P$ is increased from equal-speed condition, the speed is lowered; when $\theta_P = \theta_M$, the speed is lowered infinitely, i.e., No=0 irrespective of the value of Ni, and hence the output tubular shaft 25 is stopped; and when $\theta_P > \theta_M$, the output tubular shaft 25 is reversed.

In the reverse rotation range of the output tubular shaft 25,
when tan $\theta_P$/tan $\theta_M$=2,-|No| = |Ni|, and
when tan $\theta_P$/tan $\theta_M$>2,-|No| > |Ni|, i.e., the speed is increased while the output tubular shaft 25 is being reversed.

While $\theta_M$ is fixed and $\theta_P$ is variable in the illustrated embodiment, the transmission ratio $\pi$ can be varied in the above manner even if both of $\theta_M$ and $\theta_P$ are variable.

Even when the condition of No=Ni is achieved with $\theta_P$=0, oil leakage is inevitable along the sliding surfaces subjected to high oil pressure, such as the sliding surfaces of the plungers 9, 19 and the cylinder holes 8, 18, and the sliding surfaces of the distribution valves 61, 62 and the valve holes 54, 55, and hence the transmission efficiency is lowered. And the condition No =Ni is often reached while the automobile is being driven. Under this condition, therefore, the first eccentric ring 63 is controlled to move to the lock-up position 1 to cause all of the first distribution valves 61 to close all of the pump ports a. Since the hydraulic pump P and the hydraulic motor M are now out of mutual communication, those sliding surfaces which are subjected to high oil pressure are greatly reduced, and any reduction in the transmission efficiency due to oil leakage is lowered.

By then moving the first eccentric ring 63 to the clutch-off position f, some of the first distribution valves 61 provide mutual communication between the inner and outer oil passages 52, 53, as described above, interconnecting the suction and discharge regions of the hydraulic pump P and also the expansion and contraction regions of the hydraulic motor M through the oil passages 52, 53. Therefore, power transmission between the hydraulic pump P and the hydraulic motor M is cut off, and the clutch-off condition is achieved.

At the time of operation of the hydraulic pump P and the hydraulic motor M, the pump swash plate 10 receives a thrust load from the pump plungers 9 in one direction, and the motor swash plate 20 receives a thrust load from the motor plungers 19 in the opposite direction. The thrust load applied to the pump swash plate 10 is transmitted to the input shaft 2 through the thrust roller bearing 11, the trunnion shaft 12, the swash plate anchor 13, the thrust roller bearing 37, and the first thrust support plate 35. The thrust load applied to the motor swash plate 20 is transmitted also to the input shaft 2 through the thrust roller bearing 26, the motor swash plate holder 27, the thrust roller bearing 40, and the second thrust support plate 36. Therefore, the above thrust loads only develop tensile stresses in the input shaft 2, but are not imposed on the casing C.

Figure 8:
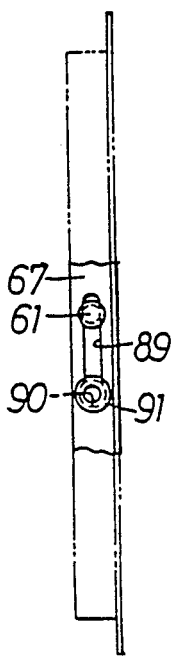
FIG. 8 is a fragmentary view as viewed in the direction of the arrow VIII in FIG. 5.
Figure 9:
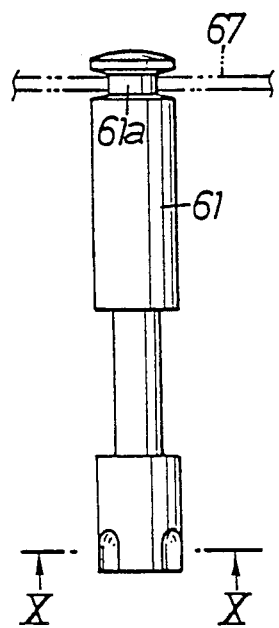
FIG. 9 is a plan view of a first distribution valve.
Figure 10:
FIG. 10 is a cross-sectional view taken along line X—X of FIG. 9.

The first distribution valves 61 and the forcing ring 67 are coupled to each other as follows: As shown in FIGS. 7 through 9, the distribution valves 61 have smaller-diameter necks 61a, and the forcing ring 67 has a plurality of circumferentially oblong holes 89 defined therein in which the smaller-diameter necks 61a engage. Each of the oblong holes 89 has one end connected to a larger-diameter hole 90 through which a larger-diameter outer end of the distribution valve 61 can pass. For assembly, the distribution valve 61 is first inserted into the larger-diameter hole 90 until the neck 61a is aligned with the oblong hole 89, and then the forcing ring 67 is rotated circumferentially to cause the neck 61a to engage into the oblong hole 89. Thereafter, a resilient plug 91 is fitted into at least one of the larger-diameter holes 90 to keep the first distribution valves 61 retained in the respective oblong holes 89.

Figure 12:
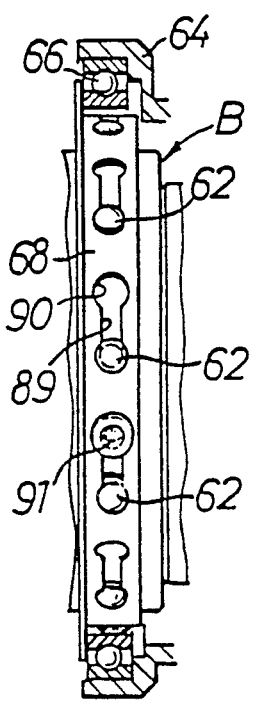
FIG. 12 is a cross-sectional view taken along line XII—XII of FIG. 11.

The second distribution valves 62 and the forcing ring 68 are coupled to each other in the same manner as described above with reference to the first distribution valves 61 and the forcing ring 67. Those parts of the second distribution valves 62 and the forcing ring 68 which are identical to those of the first distribution valves 61 and the forcing ring 67 are denoted by identical reference numerals in FIGS. 11 and 12, and will not described in detail.

As shown in FIGS. 3 and 18, a transmission control device 93 is coupled to the trunnion shaft 12 for controlling the angle of the pump swash plate 10. The transmission control device 93 comprises a sector gear 96 fixed to one end of the trunnion shaft 12 by means of a bolt 94 and a pair of knock pins 95, a worm gear 97 meshing with the sector gear 96, and a reversible DC motor 99 having a drive shaft 98 coupled to the worm gear 97. The worm gear 97 is rotatably supported in a gear box 101 by means of bearings 102, 103, the gear box 101 being fixed to the casing C by a bolt 100. The motor 99 has a stator fixed to a suitable portion of the casing C.

When the motor 99 is rotated in one direction or the other, the rotation is transmitted from the worm gear 97 to the sector gear 96 while its speed is being reduced thereby, and is then transmitted to the trunnion shaft 12 to rotate the same for erecting or tilting the pump swash plate 10.

When the motor 99 is de-energized to keep the pump swash plate 10 at a desired angle, the pump swash plate 10 receives a moment in a direction to erect or tilt the same from the motor plungers 19, and such a moment is applied via the trunnion shaft 12 to the sector gear 96. However, since the worm gear 97 cannot be rotated by the sector gear 96, the gears 96, 97 are locked together to prevent the trunnion shaft 12 from being rotated under such a moment. Therefore, the pump swash plate 10 is reliably held in position when the motor 99 is de-energized.

Referring back to FIGS. 2 and 3, the input shaft 2 has a main oil passage 108 defined centrally axially therein and having a closed end. The main oil passage 108 has an open end communicating with an oil reservoir 110 on the bottom of the casing C through a replenishing pump 107. The replenishing pump 107 is actuated by a driver gear 128 on the outer periphery of the first thrust support plate 35 on the input shaft 2. Therefore, as long as the input shaft 2 rotates, oil in the oil reservoir 110 is fed to the main oil passage 108 by the replenishing pump 107.

The oil fed to the main oil passage 108 is supplied into the inner oil passage 52 through radial replenishing holes 111 defined in the input shaft 2. Consequently, any leakage of oil from the closed hydraulic circuit between the hydraulic pump P and the hydraulic motor M is compensated for.

Figure 13:
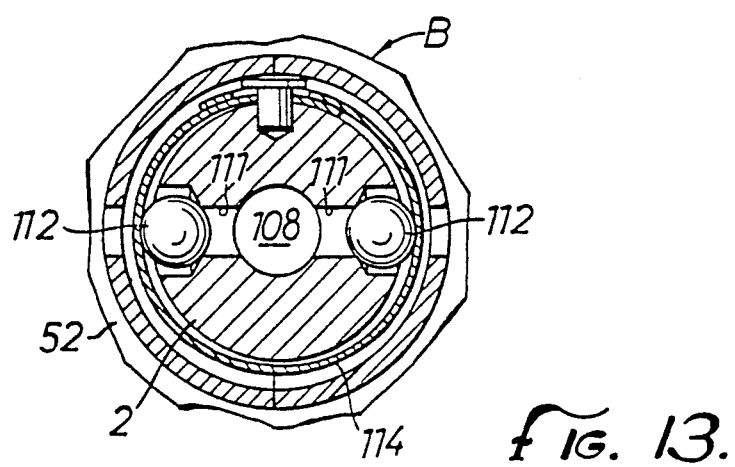
FIGS. 13 and 14 are cross-sectional views taken along lines XIII—XIII and XIV—XIV of FIG. 3.

As shown in FIGS. 2 and 13, first check valves 112 are disposed respectively in the replenishing holes 111 for preventing oil from flowing back from the inner oil passage 52. The check valves 112 are normally urged in a valve closing direction by a leaf spring 114 surrounding the input shaft 2.

When the transmission is under a reverse load, i.e., when the automobile is subjected to engine braking, the hydraulic motor M operates as a pump and the hydraulic pump P operates as a motor. Thus, the outer oil passage 53 becomes lower in pressure and the inner oil passage 52 becomes higher in pressure, tending to force working oil from the inner oil passage 52 into the replenishing holes 111. However, the oil flow is checked by the first check valves 112. The reverse load is therefore reliably transmitted from the hydraulic motor M to the hydraulic pump P, providing a good engine braking effect.

The oil supplied to the main oil passage 108 is also delivered to lubricating oil passages 117, 118 through a pair of radial orifices 115, 116, respectively, defined in the input shaft 2. The lubricating oil passages 117, 118 are defined as annular grooves in the outer periphery of the input shaft 2 in facing relation to inner peripheral surfaces of the pump cylinder 7 and the motor cylinder 17.

The oil delivered to the lubricating oil passage 117 (shown on the lefthand side) is introduced into the output tubular shaft 25 through an axial groove 119 defined in the area 32 where the cylinder block B is splined to the input shaft 2. The oil introduced into the output tubular shaft 25 lubricates the motor swash plate 20, the motor plungers 19, the thrust roller bearing 26, the needle bearing 41, the seat member 33, the aligning member 51, and other members.

In order to well lubricate the thrust roller bearing 26 and the needle bearing 41, a small hole 120 is defined in the input shaft 2 in communication with the main oil passage 108 in the vicinity of the bearings 26, 41.

The oil that has lubricated the needle bearing 41 is scattered radially outwardly under centrifugal forces and then lubricates the thrust roller bearing 40.

The oil which is delivered to the lubricating oil passage 113 (shown on the righthand side) is introduced into the swash plate anchor 13 and the cylinder holder 14 through an oil groove 121 (FIG. 3) defined axially through the flange 2a of the input shaft 2 against which the end of the pump cylinder 7 is held. The pump swash plate 10, the pump plungers 9, the thrust roller bearing 11, the trunnion shaft 12, the aligning member 50, the needle bearing 38, and other members in the swash plate anchor 13 and the cylinder holder 14 are thus lubricated.

A small hole 122 is defined in the input shaft 2 in communication with the main oil passage 108 in the vicinity of the needle bearing 38 in order to well lubricate the needle bearing 38.

The oil that has lubricated the needle bearing 38 is scattered radially outwardly under centrifugal forces and lubricates the thrust roller bearing 37.

Figure 16:
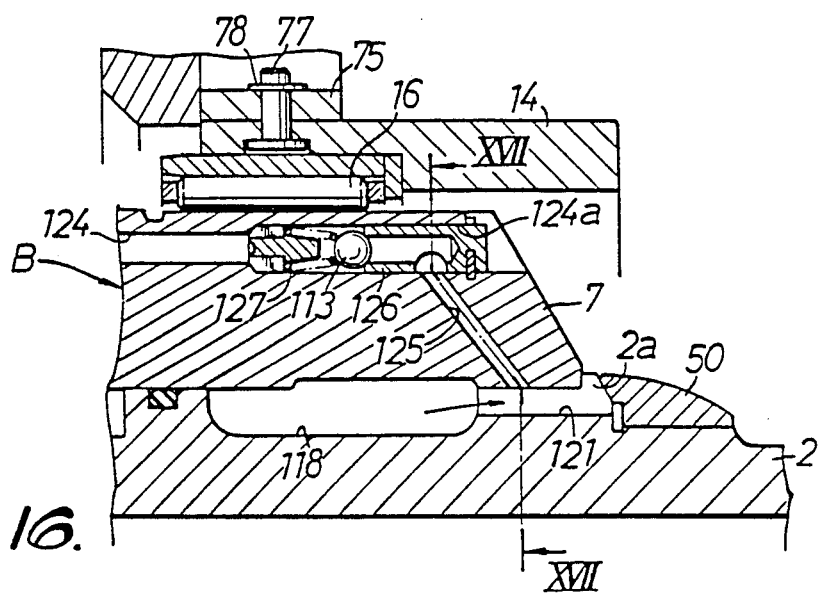
FIG. 16 is an enlarged fragmentary view of a portion of FIG. 3.
Figure 17:
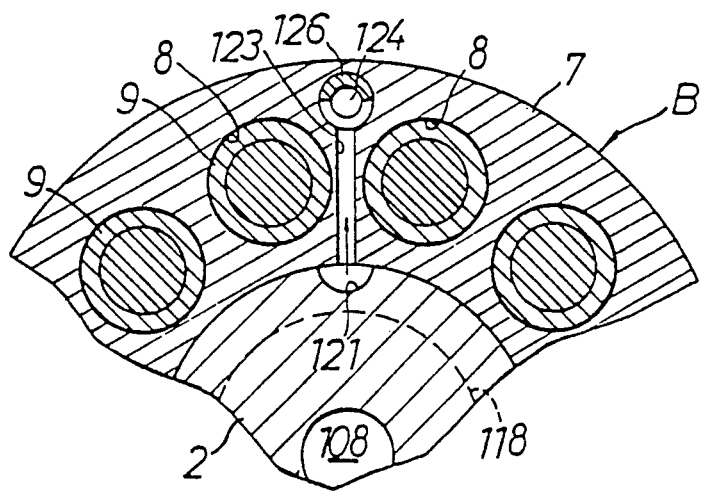
FIG. 17 is a cross-sectional view taken along line XVII—XVII of FIG. 16.

As shown in FIGS. 15 through 17, the pump cylinder 7 has defined therein a radial oil passage 123 extending between two adjacent cylinder holes 8 and having an inner end connected to the oil groove 121, and an axial oil passage 124 communicating an outer end of the oil passage 123 with the outer oil passage 53. The axial oil passage 124 accommodates therein a second check valve 113 for preventing working oil from flowing back from the outer oil passage 53. The second check valve 113 coacts with a valve seat 126 which serves as a plug that closes an open end 124a of the oil passage 124. The second check valve 113 is normally urged against the valve seat 126 by means of a spring 127.

When the transmission operates under a normal load with the outer oil passage 53 being higher in oil pressure, the second check valve 113 remains closed to prevent working oil from flowing from the outer oil passage 53 toward the oil passage 124. However, upon engine braking with the outer oil passage 53 being lower in oil pressure, the second check valve 113 is opened by working oil leakage from the closed hydraulic circuit, so that the outer oil passage 53 is replenished with working oil from the main oil passage 108 successively through the oil groove 121 and the oil passages 123, 124.

With the arrangement of the present invention, as described above, the pump cylinder 7 and the motor cylinder 17 are integrally coupled to each other into the cylinder block B, and the input shaft 2 coupled to the engine E is connected centrally to the cylinder block B whereas the output tubular shaft 25 is connected to the outer periphery of the cylinder block B. Moreover, the pump swash plate 10 is supported by the stationary machine frame or the casing C, and the motor swash plate 20 is supported by the output tubular shaft 25. With the input shaft 2 disposed in the central area of the cylinder block B and the output tubular shaft 25 disposed in the outer peripheral area of the cylinder block B, the transmission T is of a highly compact structure. Therefore, the transmission T can be incorporated in a power unit in which the input shaft of the transmission is coupled coaxially to the engine.

Although a certain preferred embodiment has been shown and described, it should be understood that many changes and modifications may be made therein without departing from the scope of the appended claims.

What is claimed is:

1. A hydrostatically operated continuously variable transmission for use with an engine, comprising:
 a swash-plate-type axial-piston hydraulic pump having a pump cylinder and a pump swash plate;
 a swash-plate-type axial-piston hydraulic motor having a motor cylinder and a motor swash plate, at least one of said pump and motor swash plates being tiltable;
 a closed hydraulic circuit interconnecting said hydraulic pump and said hydraulic motor;

said pump cylinder and said motor cylinder being disposed coaxially with each other and integrally coupled to each other into a cylinder block;

an input shaft adapted to be connected to the engine and coupled centrally to said cylinder block;

an output tubular shaft adapted to be connected to a load and relatively rotatably disposed on an outer periphery of said cylinder block; and said pump swash plate being supported by a stationary machine frame, said motor swash plate being supported by said output tubular shaft.

2. A hydrostatically operated continuously variable transmission according to claim 1, wherein said cylinder block has higher- and lower-pressure oil passages defined therein, said pump cylinder having a plurality of cylinder holes and said motor cylinder having a plurality of cylinder holes, further including first distribution means responsive to rotation of said cylinder block for alternately communicating said cylinder holes of said pump cylinder with said higher- and lower-pressure oil passages, and second distribution means responsive to relative rotation of said cylinder block and said output tubular shaft for alternately communicating said cylinder holes of said motor cylinder with said higher- and lower-pressure oil passages.

3. A hydrostatically operated continuously variable transmission according to claim 2, wherein said first distribution means comprising a plurality of first distribution valves disposed in respective first valve holes defined in said cylinder block across said higher and lower-pressure oil passages, said first valve holes being connected to said cylinder holes of said pump cylinder through pump ports defined in said cylinder block, said second distribution means comprising a plurality of second distribution valves disposed in respective second valve holes defined in said cylinder block across said higher- and lower-pressure oil passages, said second valve holes being connected to said cylinder holes of said motor cylinder through motor ports defined in said cylinder block.

* * * * *